(12) United States Patent
Bertero et al.

(10) Patent No.: US 9,183,867 B1
(45) Date of Patent: Nov. 10, 2015

(54) SYSTEMS AND METHODS FOR FORMING IMPLANTED CAPPING LAYERS IN MAGNETIC MEDIA FOR MAGNETIC RECORDING

(71) Applicant: WD Media, Inc., San Jose, CA (US)

(72) Inventors: Gerardo A. Bertero, Redwood City, CA (US); Michael Alex, Fremont, CA (US)

(73) Assignee: WD Media, LLC, San Jose, CA (US)

( * ) Notice: Subject to any disclaimer, the term of this patent is extended or adjusted under 35 U.S.C. 154(b) by 35 days.

(21) Appl. No.: 13/773,466

(22) Filed: Feb. 21, 2013

(51) Int. Cl.
*G11B 5/66* (2006.01)
*G11B 5/84* (2006.01)
*G11B 5/62* (2006.01)

(52) U.S. Cl.
CPC .. *G11B 5/84* (2013.01); *G11B 5/62* (2013.01); *G11B 5/66* (2013.01)

(58) Field of Classification Search
None
See application file for complete search history.

(56) References Cited

U.S. PATENT DOCUMENTS

| | | | |
|---|---|---|---|
| 6,013,161 A | 1/2000 | Chen et al. |
| 6,063,248 A | 5/2000 | Bourez et al. |
| 6,068,891 A | 5/2000 | O'Dell et al. |
| 6,086,730 A | 7/2000 | Liu et al. |
| 6,099,981 A | 8/2000 | Nishimori |
| 6,103,404 A | 8/2000 | Ross et al. |
| 6,117,499 A | 9/2000 | Wong et al. |
| 6,136,403 A | 10/2000 | Prabhakara et al. |
| 6,143,375 A | 11/2000 | Ross et al. |
| 6,145,849 A | 11/2000 | Bae et al. |
| 6,146,737 A | 11/2000 | Malhotra et al. |
| 6,149,696 A | 11/2000 | Jia |
| 6,150,015 A | 11/2000 | Bertero et al. |
| 6,156,404 A | 12/2000 | Ross et al. |
| 6,159,076 A | 12/2000 | Sun et al. |
| 6,164,118 A | 12/2000 | Suzuki et al. |
| 6,200,441 B1 | 3/2001 | Gornicki et al. |
| 6,204,995 B1 | 3/2001 | Hokkyo et al. |
| 6,206,765 B1 | 3/2001 | Sanders et al. |
| 6,210,819 B1 | 4/2001 | Lal et al. |
| 6,216,709 B1 | 4/2001 | Fung et al. |
| 6,221,119 B1 | 4/2001 | Homola |
| 6,248,395 B1 | 6/2001 | Homola et al. |
| 6,261,681 B1 | 7/2001 | Suekane et al. |
| 6,270,885 B1 | 8/2001 | Hokkyo et al. |
| 6,274,063 B1 | 8/2001 | Li et al. |
| 6,283,838 B1 | 9/2001 | Blake et al. |
| 6,287,429 B1 | 9/2001 | Moroishi et al. |
| 6,290,573 B1 | 9/2001 | Suzuki |
| 6,299,947 B1 | 10/2001 | Suzuki et al. |
| 6,303,217 B1 | 10/2001 | Malhotra et al. |
| 6,309,765 B1 | 10/2001 | Suekane et al. |

(Continued)

OTHER PUBLICATIONS

Michael Nastasi, "Ion Beam Mixing", presented in Sicily, Italy, Jul. 2004. Materials Sci.Tech.Div., Los Alamos National Laboratory, New Mexico. 42 pages.

(Continued)

*Primary Examiner* — Kevin Bernatz (57) ABSTRACT

Systems and methods for forming implanted capping layers in magnetic media for magnetic recording are provided. One such method includes providing an underlayer, providing a magnetic recording layer on the underlayer, the magnetic recording layer including a bottom surface and a top surface where the bottom surface is between the top surface and the underlayer, and implanting a capping material in the top surface of the magnetic recording layer using a direct implantation technique or an indirect implantation technique.

20 Claims, 4 Drawing Sheets

(56) References Cited

U.S. PATENT DOCUMENTS

| | | | |
|---|---|---|---|
| 6,358,636 B1 | 3/2002 | Yang et al. |
| 6,362,452 B1 | 3/2002 | Suzuki et al. |
| 6,363,599 B1 | 4/2002 | Bajorek |
| 6,365,012 B1 | 4/2002 | Sato et al. |
| 6,381,090 B1 | 4/2002 | Suzuki et al. |
| 6,381,092 B1 | 4/2002 | Suzuki |
| 6,387,483 B1 | 5/2002 | Hokkyo et al. |
| 6,391,213 B1 | 5/2002 | Homola |
| 6,395,349 B1 | 5/2002 | Salamon |
| 6,403,919 B1 | 6/2002 | Salamon |
| 6,408,677 B1 | 6/2002 | Suzuki |
| 6,426,157 B1 | 7/2002 | Hokkyo et al. |
| 6,429,984 B1 | 8/2002 | Alex |
| 6,482,330 B1 | 11/2002 | Bajorek |
| 6,482,505 B1 | 11/2002 | Bertero et al. |
| 6,500,567 B1 | 12/2002 | Bertero et al. |
| 6,528,124 B1 | 3/2003 | Nguyen |
| 6,548,821 B1 | 4/2003 | Treves et al. |
| 6,552,871 B2 | 4/2003 | Suzuki et al. |
| 6,565,719 B1 | 5/2003 | Lairson et al. |
| 6,566,674 B1 | 5/2003 | Treves et al. |
| 6,571,806 B2 | 6/2003 | Rosano et al. |
| 6,628,466 B2 | 9/2003 | Alex |
| 6,664,503 B1 | 12/2003 | Hsieh et al. |
| 6,670,055 B2 | 12/2003 | Tomiyasu et al. |
| 6,682,807 B2 | 1/2004 | Lairson et al. |
| 6,683,754 B2 | 1/2004 | Suzuki et al. |
| 6,730,420 B1 | 5/2004 | Bertero et al. |
| 6,743,528 B2 | 6/2004 | Suekane et al. |
| 6,759,138 B2 | 7/2004 | Tomiyasu et al. |
| 6,773,826 B2 | 8/2004 | Nakagawa et al. |
| 6,778,353 B1 | 8/2004 | Harper |
| 6,795,274 B1 | 9/2004 | Hsieh et al. |
| 6,855,232 B2 | 2/2005 | Jairson et al. |
| 6,857,937 B2 | 2/2005 | Bajorek |
| 6,893,748 B2 | 5/2005 | Bertero et al. |
| 6,899,959 B2 | 5/2005 | Bertero et al. |
| 6,916,558 B2 | 7/2005 | Umezawa et al. |
| 6,939,120 B1 | 9/2005 | Harper |
| 6,946,191 B2 | 9/2005 | Morikawa et al. |
| 6,967,798 B2 | 11/2005 | Homola et al. |
| 6,972,135 B2 | 12/2005 | Homola |
| 7,004,827 B1 | 2/2006 | Suzuki et al. |
| 7,006,323 B1 | 2/2006 | Suzuki |
| 7,016,154 B2 | 3/2006 | Nishihira |
| 7,019,924 B2 | 3/2006 | McNeil et al. |
| 7,045,215 B2 | 5/2006 | Shimokawa |
| 7,052,757 B2 | 5/2006 | Chaiken et al. |
| 7,070,870 B2 | 7/2006 | Bertero et al. |
| 7,090,934 B2 | 8/2006 | Hokkyo et al. |
| 7,099,112 B1 | 8/2006 | Harper |
| 7,105,241 B2 | 9/2006 | Shimokawa et al. |
| 7,119,990 B2 | 10/2006 | Bajorek et al. |
| 7,147,790 B2 | 12/2006 | Wachenschwanz et al. |
| 7,161,753 B2 | 1/2007 | Wachenschwanz et al. |
| 7,166,319 B2 | 1/2007 | Ishiyama |
| 7,166,374 B2 | 1/2007 | Suekane et al. |
| 7,169,487 B2 | 1/2007 | Kawai et al. |
| 7,174,775 B2 | 2/2007 | Ishiyama |
| 7,179,549 B2 | 2/2007 | Malhotra et al. |
| 7,184,139 B2 | 2/2007 | Treves et al. |
| 7,196,860 B2 | 3/2007 | Alex |
| 7,199,977 B2 | 4/2007 | Suzuki et al. |
| 7,208,236 B2 | 4/2007 | Morikawa et al. |
| 7,220,500 B1 | 5/2007 | Tomiyasu et al. |
| 7,229,266 B2 | 6/2007 | Harper |
| 7,239,970 B2 | 7/2007 | Treves et al. |
| 7,252,897 B2 | 8/2007 | Shimokawa et al. |
| 7,277,254 B2 | 10/2007 | Shimokawa et al. |
| 7,281,920 B2 | 10/2007 | Homola et al. |
| 7,292,329 B2 | 11/2007 | Treves et al. |
| 7,301,726 B1 | 11/2007 | Suzuki |
| 7,302,148 B2 | 11/2007 | Treves et al. |
| 7,305,119 B2 | 12/2007 | Treves et al. |
| 7,314,404 B2 | 1/2008 | Singh et al. |
| 7,320,584 B1 | 1/2008 | Harper et al. |
| 7,329,114 B2 | 2/2008 | Harper et al. |
| 7,375,362 B2 | 5/2008 | Treves et al. |
| 7,420,886 B2 | 9/2008 | Tomiyasu et al. |
| 7,425,719 B2 | 9/2008 | Treves et al. |
| 7,471,484 B2 | 12/2008 | Wachenschwanz et al. |
| 7,498,062 B2 | 3/2009 | Calcaterra et al. |
| 7,531,485 B2 | 5/2009 | Hara et al. |
| 7,537,846 B2 | 5/2009 | Ishiyama et al. |
| 7,549,209 B2 | 6/2009 | Wachenschwanz et al. |
| 7,569,490 B2 | 8/2009 | Staud |
| 7,597,792 B2 | 10/2009 | Homola et al. |
| 7,597,973 B2 | 10/2009 | Ishiyama |
| 7,608,193 B2 | 10/2009 | Wachenschwanz et al. |
| 7,632,087 B2 | 12/2009 | Homola |
| 7,656,615 B2 | 2/2010 | Wachenschwanz et al. |
| 7,682,546 B2 | 3/2010 | Harper |
| 7,684,152 B2 | 3/2010 | Suzuki et al. |
| 7,686,606 B2 | 3/2010 | Harper et al. |
| 7,686,991 B2 | 3/2010 | Harper |
| 7,695,833 B2 | 4/2010 | Ishiyama |
| 7,722,968 B2 | 5/2010 | Ishiyama |
| 7,733,605 B2 | 6/2010 | Suzuki et al. |
| 7,736,768 B2 | 6/2010 | Ishiyama |
| 7,755,861 B1 | 7/2010 | Li et al. |
| 7,758,732 B1 | 7/2010 | Calcaterra et al. |
| 7,833,639 B2 | 11/2010 | Sonobe et al. |
| 7,833,641 B2 | 11/2010 | Tomiyasu et al. |
| 7,910,159 B2 | 3/2011 | Jung |
| 7,911,736 B2 | 3/2011 | Bajorek |
| 7,924,519 B2 | 4/2011 | Lambert |
| 7,944,165 B1 | 5/2011 | O'Dell |
| 7,944,643 B1 | 5/2011 | Jiang et al. |
| 7,955,723 B2 | 6/2011 | Umezawa et al. |
| 7,983,003 B2 | 7/2011 | Sonobe et al. |
| 7,993,497 B2 | 8/2011 | Moroishi et al. |
| 7,993,765 B2 | 8/2011 | Kim et al. |
| 7,998,607 B2 | 8/2011 | Ikeda |
| 7,998,912 B2 | 8/2011 | Chen et al. |
| 8,002,901 B1 | 8/2011 | Chen et al. |
| 8,003,237 B2 | 8/2011 | Sonobe et al. |
| 8,012,920 B2 | 9/2011 | Shimokawa |
| 8,038,863 B2 | 10/2011 | Homola |
| 8,057,926 B2 | 11/2011 | Ayama et al. |
| 8,062,778 B2 | 11/2011 | Suzuki et al. |
| 8,064,156 B1 | 11/2011 | Suzuki et al. |
| 8,067,104 B2 * | 11/2011 | Tanaka et al. ................. 428/832 |
| 8,076,013 B2 | 12/2011 | Sonobe et al. |
| 8,089,723 B2 | 1/2012 | Schabes |
| 8,092,931 B2 | 1/2012 | Ishiyama et al. |
| 8,100,685 B1 | 1/2012 | Harper et al. |
| 8,101,054 B2 | 1/2012 | Chen et al. |
| 8,125,723 B1 | 2/2012 | Nichols et al. |
| 8,125,724 B1 | 2/2012 | Nichols et al. |
| 8,137,517 B1 | 3/2012 | Bourez |
| 8,142,916 B2 | 3/2012 | Umezawa et al. |
| 8,163,093 B1 | 4/2012 | Chen et al. |
| 8,171,949 B1 | 5/2012 | Lund et al. |
| 8,173,282 B1 | 5/2012 | Sun et al. |
| 8,178,480 B2 | 5/2012 | Hamakubo et al. |
| 8,202,636 B2 | 6/2012 | Choe et al. |
| 8,206,789 B2 | 6/2012 | Suzuki |
| 8,218,260 B2 | 7/2012 | Iamratanakul et al. |
| 8,247,095 B2 | 8/2012 | Champion et al. |
| 8,257,783 B2 | 9/2012 | Suzuki et al. |
| 8,298,609 B1 | 10/2012 | Liew et al. |
| 8,298,689 B2 | 10/2012 | Sonobe et al. |
| 8,309,239 B2 | 11/2012 | Umezawa et al. |
| 8,316,668 B1 | 11/2012 | Chan et al. |
| 8,331,056 B2 | 12/2012 | O'Dell |
| 8,354,618 B1 | 1/2013 | Chen et al. |
| 8,367,228 B2 | 2/2013 | Sonobe et al. |
| 8,383,209 B2 | 2/2013 | Ayama |
| 8,394,243 B1 | 3/2013 | Jung et al. |
| 8,397,751 B1 | 3/2013 | Chan et al. |
| 8,399,809 B1 | 3/2013 | Bourez |
| 8,402,638 B1 | 3/2013 | Treves et al. |
| 8,404,056 B1 | 3/2013 | Chen et al. |
| 8,404,369 B2 | 3/2013 | Ruffini et al. |

(56) References Cited

U.S. PATENT DOCUMENTS

| | | |
|---|---|---|
| 8,404,370 B2 | 3/2013 | Sato et al. |
| 8,406,918 B2 | 3/2013 | Tan et al. |
| 8,414,966 B2 | 4/2013 | Yasumori et al. |
| 8,425,975 B2 | 4/2013 | Ishiyama |
| 8,431,257 B2 | 4/2013 | Kim et al. |
| 8,431,258 B2 | 4/2013 | Onoue et al. |
| 8,453,315 B2 | 6/2013 | Kajiwara et al. |
| 8,488,276 B1 | 7/2013 | Jung et al. |
| 8,491,800 B1 | 7/2013 | Dorsey |
| 8,492,009 B1 | 7/2013 | Homola et al. |
| 8,492,011 B2 | 7/2013 | Itoh et al. |
| 8,496,466 B1 | 7/2013 | Treves et al. |
| 8,517,364 B1 | 8/2013 | Crumley et al. |
| 8,517,657 B2 | 8/2013 | Chen et al. |
| 8,524,052 B1 | 9/2013 | Tan et al. |
| 8,530,065 B1 | 9/2013 | Chernyshov et al. |
| 8,546,000 B2 | 10/2013 | Umezawa |
| 8,551,253 B2 | 10/2013 | Na'im et al. |
| 8,551,627 B2 | 10/2013 | Shimada et al. |
| 8,556,566 B1 | 10/2013 | Suzuki et al. |
| 8,559,131 B2 | 10/2013 | Masuda et al. |
| 8,562,748 B1 | 10/2013 | Chen et al. |
| 8,565,050 B1 | 10/2013 | Bertero et al. |
| 8,570,844 B1 | 10/2013 | Yuan et al. |
| 8,576,519 B1 | 11/2013 | Carey et al. |
| 8,580,410 B2 | 11/2013 | Onoue |
| 8,584,687 B1 | 11/2013 | Chen et al. |
| 8,591,709 B1 | 11/2013 | Lim et al. |
| 8,592,061 B2 | 11/2013 | Onoue et al. |
| 8,596,287 B1 | 12/2013 | Chen et al. |
| 8,597,723 B1 | 12/2013 | Jung et al. |
| 8,603,649 B2 | 12/2013 | Onoue |
| 8,603,650 B2 | 12/2013 | Sonobe et al. |
| 8,605,388 B2 | 12/2013 | Yasumori et al. |
| 8,605,555 B1 | 12/2013 | Chernyshov et al. |
| 8,608,147 B1 | 12/2013 | Yap et al. |
| 8,609,263 B1 | 12/2013 | Chernyshov et al. |
| 8,619,381 B2 | 12/2013 | Moser et al. |
| 8,623,528 B2 | 1/2014 | Umezawa et al. |
| 8,623,529 B2 | 1/2014 | Suzuki |
| 8,634,155 B2 | 1/2014 | Yasumori et al. |
| 8,658,003 B1 | 2/2014 | Bourez |
| 8,658,292 B1 | 2/2014 | Mallary et al. |
| 8,665,541 B2 | 3/2014 | Saito |
| 8,668,953 B1 | 3/2014 | Buechel-Rimmel |
| 8,674,327 B1 | 3/2014 | Poon et al. |
| 8,685,214 B1 | 4/2014 | Moh et al. |
| 8,696,404 B2 | 4/2014 | Sun et al. |
| 8,711,499 B1 | 4/2014 | Desai et al. |
| 8,743,666 B1 | 6/2014 | Bertero et al. |
| 8,758,912 B2 | 6/2014 | Srinivasan et al. |
| 8,787,124 B1 | 7/2014 | Chernyshov et al. |
| 8,787,130 B1 | 7/2014 | Yuan et al. |
| 8,791,391 B2 | 7/2014 | Bourez |
| 8,795,765 B2 | 8/2014 | Koike et al. |
| 8,795,790 B2 | 8/2014 | Sonobe et al. |
| 8,795,857 B2 | 8/2014 | Ayama et al. |
| 8,800,322 B1 | 8/2014 | Chan et al. |
| 8,811,129 B1 | 8/2014 | Yuan et al. |
| 8,817,410 B1 | 8/2014 | Moser et al. |
| 8,900,730 B2 * | 12/2014 | Bhatia et al. ............... 428/834 |
| 8,947,987 B1 * | 2/2015 | Wang et al. ............... 369/13.35 |
| 2002/0060883 A1 | 5/2002 | Suzuki |
| 2003/0022024 A1 | 1/2003 | Wachenschwanz |
| 2004/0022387 A1 | 2/2004 | Weikle |
| 2004/0132301 A1 | 7/2004 | Harper et al. |
| 2004/0202793 A1 | 10/2004 | Harper et al. |
| 2004/0202865 A1 | 10/2004 | Homola et al. |
| 2004/0209123 A1 | 10/2004 | Bajorek et al. |
| 2004/0209470 A1 | 10/2004 | Bajorek |
| 2005/0036223 A1 | 2/2005 | Wachenschwanz et al. |
| 2005/0142990 A1 | 6/2005 | Homola |
| 2005/0150862 A1 | 7/2005 | Harper et al. |
| 2005/0151282 A1 | 7/2005 | Harper et al. |
| 2005/0151283 A1 | 7/2005 | Bajorek et al. |
| 2005/0151300 A1 | 7/2005 | Harper et al. |
| 2005/0155554 A1 | 7/2005 | Saito |
| 2005/0167867 A1 | 8/2005 | Bajorek et al. |
| 2005/0263401 A1 | 12/2005 | Olsen et al. |
| 2006/0147758 A1 | 7/2006 | Jung et al. |
| 2006/0181697 A1 | 8/2006 | Treves et al. |
| 2006/0207890 A1 | 9/2006 | Staud |
| 2006/0286413 A1 | 12/2006 | Liu et al. |
| 2007/0070549 A1 | 3/2007 | Suzuki et al. |
| 2007/0087227 A1 | 4/2007 | Ma et al. |
| 2007/0245909 A1 | 10/2007 | Homola |
| 2008/0075845 A1 | 3/2008 | Sonobe et al. |
| 2008/0093760 A1 | 4/2008 | Harper et al. |
| 2008/0138662 A1 | 6/2008 | Berger et al. |
| 2009/0117408 A1 | 5/2009 | Umezawa et al. |
| 2009/0136784 A1 | 5/2009 | Suzuki et al. |
| 2009/0155627 A1 | 6/2009 | Berger et al. |
| 2009/0169922 A1 | 7/2009 | Ishiyama |
| 2009/0191331 A1 | 7/2009 | Umezawa et al. |
| 2009/0202866 A1 | 8/2009 | Kim et al. |
| 2009/0273861 A1 * | 11/2009 | Tanaka et al. ............... 360/254 |
| 2009/0311557 A1 | 12/2009 | Onoue et al. |
| 2010/0073813 A1 | 3/2010 | Dai et al. |
| 2010/0092802 A1 | 4/2010 | Ma et al. |
| 2010/0098873 A1 * | 4/2010 | Verhaverbeke et al. ...... 427/526 |
| 2010/0119877 A1 | 5/2010 | Wu et al. |
| 2010/0143752 A1 | 6/2010 | Ishibashi et al. |
| 2010/0159283 A1 | 6/2010 | Ibusuki et al. |
| 2010/0190035 A1 | 7/2010 | Sonobe et al. |
| 2010/0196619 A1 | 8/2010 | Ishiyama |
| 2010/0196740 A1 | 8/2010 | Ayama et al. |
| 2010/0209601 A1 | 8/2010 | Shimokawa et al. |
| 2010/0215992 A1 | 8/2010 | Horikawa et al. |
| 2010/0232065 A1 | 9/2010 | Suzuki et al. |
| 2010/0247965 A1 | 9/2010 | Onoue |
| 2010/0261039 A1 | 10/2010 | Itoh et al. |
| 2010/0261040 A1 * | 10/2010 | Foad et al. ............... 428/800 |
| 2010/0279151 A1 | 11/2010 | Sakamoto et al. |
| 2010/0300884 A1 | 12/2010 | Homola et al. |
| 2010/0304186 A1 | 12/2010 | Shimokawa |
| 2011/0097603 A1 | 4/2011 | Onoue |
| 2011/0097604 A1 | 4/2011 | Onoue |
| 2011/0111159 A1 * | 5/2011 | Sinclair et al. ............... 428/64.2 |
| 2011/0143169 A1 * | 6/2011 | Albrecht et al. ............... 428/846 |
| 2011/0151278 A1 * | 6/2011 | Gurney et al. ............... 428/800 |
| 2011/0171495 A1 | 7/2011 | Tachibana et al. |
| 2011/0194207 A1 * | 8/2011 | Sato et al. ............... 360/75 |
| 2011/0206947 A1 | 8/2011 | Tachibana et al. |
| 2011/0212346 A1 | 9/2011 | Onoue et al. |
| 2011/0223446 A1 | 9/2011 | Onoue et al. |
| 2011/0244119 A1 | 10/2011 | Umezawa et al. |
| 2011/0299194 A1 | 12/2011 | Aniya et al. |
| 2011/0311841 A1 | 12/2011 | Saito et al. |
| 2012/0069466 A1 | 3/2012 | Okamoto et al. |
| 2012/0070692 A1 | 3/2012 | Sato et al. |
| 2012/0077060 A1 | 3/2012 | Ozawa |
| 2012/0127599 A1 | 5/2012 | Shimokawa et al. |
| 2012/0127601 A1 | 5/2012 | Suzuki et al. |
| 2012/0129009 A1 | 5/2012 | Sato et al. |
| 2012/0140359 A1 | 6/2012 | Tachibana |
| 2012/0141833 A1 | 6/2012 | Umezawa et al. |
| 2012/0141835 A1 | 6/2012 | Sakamoto |
| 2012/0148875 A1 | 6/2012 | Hamakubo et al. |
| 2012/0156523 A1 | 6/2012 | Seki et al. |
| 2012/0164488 A1 | 6/2012 | Shin et al. |
| 2012/0170152 A1 | 7/2012 | Sonobe et al. |
| 2012/0171369 A1 | 7/2012 | Koike et al. |
| 2012/0175243 A1 | 7/2012 | Fukuura et al. |
| 2012/0189872 A1 | 7/2012 | Umezawa et al. |
| 2012/0196049 A1 | 8/2012 | Azuma et al. |
| 2012/0207919 A1 | 8/2012 | Sakamoto et al. |
| 2012/0225217 A1 | 9/2012 | Itoh et al. |
| 2012/0251842 A1 | 10/2012 | Yuan et al. |
| 2012/0251846 A1 | 10/2012 | Desai et al. |
| 2012/0276417 A1 | 11/2012 | Shimokawa et al. |
| 2012/0308722 A1 | 12/2012 | Suzuki et al. |
| 2013/0040167 A1 | 2/2013 | Alagarsamy et al. |
| 2013/0071694 A1 | 3/2013 | Srinivasan et al. |
| 2013/0165029 A1 | 6/2013 | Sun et al. |

(56) References Cited

U.S. PATENT DOCUMENTS

| | | |
|---|---|---|
| 2013/0175252 A1 | 7/2013 | Bourez |
| 2013/0216865 A1 | 8/2013 | Yasumori et al. |
| 2013/0230647 A1 | 9/2013 | Onoue et al. |
| 2013/0314815 A1 | 11/2013 | Yuan et al. |
| 2013/0320254 A1* | 12/2013 | Bhatia et al. ............... 252/62.55 |
| 2014/0011054 A1 | 1/2014 | Suzuki |
| 2014/0044992 A1 | 2/2014 | Onoue |
| 2014/0050843 A1 | 2/2014 | Yi et al. |
| 2014/0151360 A1 | 6/2014 | Gregory et al. |
| 2014/0234666 A1 | 8/2014 | Knigge et al. |

OTHER PUBLICATIONS

Nordlund, et al., "Mechanisms of ion beam mixing in metals and semiconductors", J. Appl. Phys. 83 (3), Feb. 1, 1998. 10 pages.

Brenier, et al., "Chemical effects in ion beam mixing of Fe—Al multilayers", Journal de Physique IV, col. c3, Suppl.III, vol. 4, 1994. 9 pages.

Ghatak, et al., "Ion beam induced enhanced diffusion from gold thin films in silicon", Institute of Physics, Bhubaneswar, India; Materials Science Division, Indira Gandhi Center for Atomic Research, Kalpakkam, India. 15 pages.

Bincheng Wang, et al., U.S. Appl. No. 13/932,370, filed Jul. 1, 2013, 19 pages.

H. Nemoto et al., "Ultrahigh-Hc granular media with [CoB/Pt]n multilayer film sputtered under Ar+O2 atmosphere," Journal of Applied Physics, vol. 105, Issue 7, Apr. 2009, pp. 07B705-1 to 07B705-3.

H. Nemoto, et al., "Highly HK-graded perpendicular media with [CoB/Pt]n+O multilayer film," Journal of Applied Physics, vol. 109, Issue 7, Apr. 2011, pp. 07B719-07B719-3.

* cited by examiner

SYSTEMS AND METHODS FOR FORMING IMPLANTED CAPPING LAYERS IN MAGNETIC MEDIA FOR MAGNETIC RECORDING

FIELD

The present invention relates generally to magnetic media for magnetic recording systems, and more specifically to systems and methods for forming implanted capping layers in magnetic media for magnetic recording.

BACKGROUND

Heat assisted magnetic recording (HAMR) technology continues to be developed to replace conventional perpendicular magnetic recording (CPMR) technology and deliver higher recording densities. At the same time, HAMR media is typically rougher than CPMR because of differences in structure and process conditions. Advanced CPMR structures use multiple layers ending with a capping layer which is significantly less segregated than the layers positioned underneath the capping layer. Although not its primary function, the capping layer lowers roughness in CPMR media. In addition, the CPMR process temperature is much lower than HAMR process temperature, which leads to less tendency of grain coarsening and better control of the microstructure.

The rougher media for HAMR can lead to higher flight height and thus poorer recording performance. In addition, the rougher media for HAMR can also require thicker overcoats for corrosion protection, which results in poorer recording performance because of the larger magnetic spacing. However, the media roughness is preferably lower for higher density applications. As such, one target goal for HAMR media is for media roughness to be below that of CPMR media. The HAMR media also displays higher DC noise compared to CPMR media, which can present a number of other problems.

A capping layer is often proposed to address the problems noted above. However, capping layer deposition in HAMR media is not straightforward and frequently results in a number of other problems, including rougher media and worse overall performance. This is due, at least in part, because it is hard to achieve the desired structure with the choice of materials that would also deliver the required thermo-magnetic properties. For example, the high temperature deposition of HAMR media leads to accelerated grain coarsening in layers that do not contain enough segregants. In addition, epitaxially growing capping layers on a magnetic recording layer such as a L10 FePt base granular film is not straightforward. Accordingly, a system and method for forming a capping layer in magnetic media that addresses these problems is needed.

SUMMARY

Aspects of the invention relate to systems and methods for forming implanted capping layers in magnetic media for magnetic recording. In one embodiment, the invention relates to a method for forming an implanted capping layer within a magnetic medium, the method including providing an underlayer, providing a magnetic recording layer on the underlayer, the magnetic recording layer including a bottom surface and a top surface where the bottom surface is between the top surface and the underlayer, and implanting a capping material in the top surface of the magnetic recording layer.

In another embodiment, the invention relates to a magnetic medium having an implanted capping layer, the medium including an underlayer, and a magnetic recording layer on the underlayer, the magnetic recording layer including a bottom surface and a top surface where the bottom surface is between the top surface and the underlayer, where the top surface of the magnetic recording layer includes a capping material implanted in the top surface using ion implantation. In several embodiments, the capping layer can be implanted using a direct implantation technique or an indirect implantation technique.

DETAILED DESCRIPTION

Referring now to the drawings, embodiments of systems and methods for forming implanted capping layers in magnetic media for magnetic recording are illustrated. The methods involve providing a magnetic recording layer on an underlayer and implanting a capping layer in a top surface of the magnetic recording layer. The systems or magnetic media include a magnetic recording layer and a capping layer implanted in a top surface of the magnetic recording layer. The capping layer can be implanted using a direct implantation technique or an indirect implantation technique. The direct implantation technique can involve implanting an ionized species of a material for the capping layer in the top surface of the recording layer. The indirect implantation technique can involve depositing a material for the capping layer on the top surface of the recording layer and then performing an ion bombardment of the capping material, thereby implanting the capping material in the recording layer.

The implanted capping layer should be sufficient to provide both desirable magnetic and structural characteristics. The systems and methods for forming implanted capping layers in magnetic media described herein can be used primarily with heat/energy assisted magnetic recording (HAMR/EAMR), but also with perpendicular magnetic recording (PMR) and microwave assisted magnetic recording (MAMR).

The terms "above," "below," and "between" as used herein refer to a relative position of one layer with respect to other layers. As such, one layer deposited or disposed above or below another layer may be directly in contact with the other layer or may have one or more intervening layers. Moreover, one layer deposited or disposed between layers may be directly in contact with the layers or may have one or more intervening layers.

Figure 1:
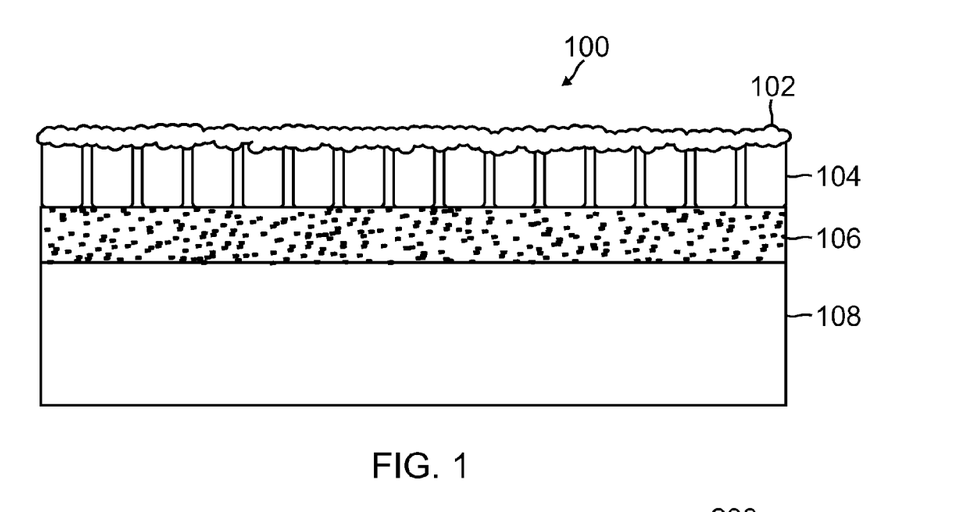
FIG. 1 is a cross sectional view of a magnetic medium with a capping layer implanted in the recording layer for use in magnetic recording in accordance with one embodiment of the invention.

FIG. 1 is a cross sectional view of a magnetic medium 100 with a capping layer 102 implanted in the recording layer 104 for use in magnetic recording in accordance with one embodiment of the invention. The magnetic medium 100 also includes a seed or growth layer 106 beneath the recording layer 104 and an underlayer 108 beneath the seed layer 106. In several embodiments, the underlayer includes one or more layers.

The capping layer 102 can be implanted in the top surface of the recording layer 104 using a direct implantation technique or an indirect implantation technique as will be discussed in greater detail below. In a number of embodiments, a concentration of the material for the capping layer 102 (e.g., capping material) in an area proximate the top surface is substantially greater than a concentration of the capping material in other areas of the magnetic recording layer 104.

In several embodiments, the recording layer 104 is made of one or more materials having a high magnetic anisotropy constant (e.g., high Ku). For example, in some embodiments, the recording layer 104 is made of FePt and/or other suitable materials and has a grain like structure arranged in a vertical orientation. In one embodiment, the capping layer 102 is made of one or more materials such as Ni, Co, Fe, Cr, Ta, C, N, B, P, F, Si, Ge, or combinations of these materials. In other embodiments, the capping layer 102 can be made of other suitable materials. In one embodiment, the growth layer 106 is made of one or more materials such as Cr, Mo, NiAl, MgO, TiC, TiN, Ag, CrMo, Pt, Pd, Ru, or combinations of these materials. In other embodiments, the growth layer can be made of other suitable materials.

While the capping layer 102 is implanted in the top surface of the recording layer, which may or may not involve material deposition, the remaining layers can be formed using deposition techniques known in the art. For example, in several embodiments, the deposition of such layers can be performed using a variety of deposition sub-processes, including, but not limited to physical vapor deposition (PVD), sputter deposition and ion beam deposition, and chemical vapor deposition (CVD) including plasma enhanced chemical vapor deposition (PECVD), low pressure chemical vapor deposition (LPCVD) and atomic layer chemical vapor deposition (AL-CVD). In other embodiments, other suitable deposition techniques known in the art may also be used.

In one embodiment, the magnetic medium 100 includes a overcoat layer such as a carbon overcoat layer or COC on the implanted capping layer 102. In some embodiments, the underlayer includes a layered structure including a substrate at the bottom, a soft magnetic underlayer, a first interlayer, a heat sink layer, a second interlayer, and a growth layer. In other embodiments, the underlayer includes a layered structure including a substrate at the bottom, a soft magnetic underlayer, a seed layer, and an interlayer. In one such embodiment, the underlayer includes all of those layers except the seed layer. The substrate can be made of a material such as an Al alloy, NiP plated Al, glass, glass ceramic, and/or combinations of these or other suitable materials. The heat sink can be made of a material such as Ag, Al, Cu, Cr, Ru, NiAl, NiTa, and combinations of these or other suitable materials.

Figure 2:
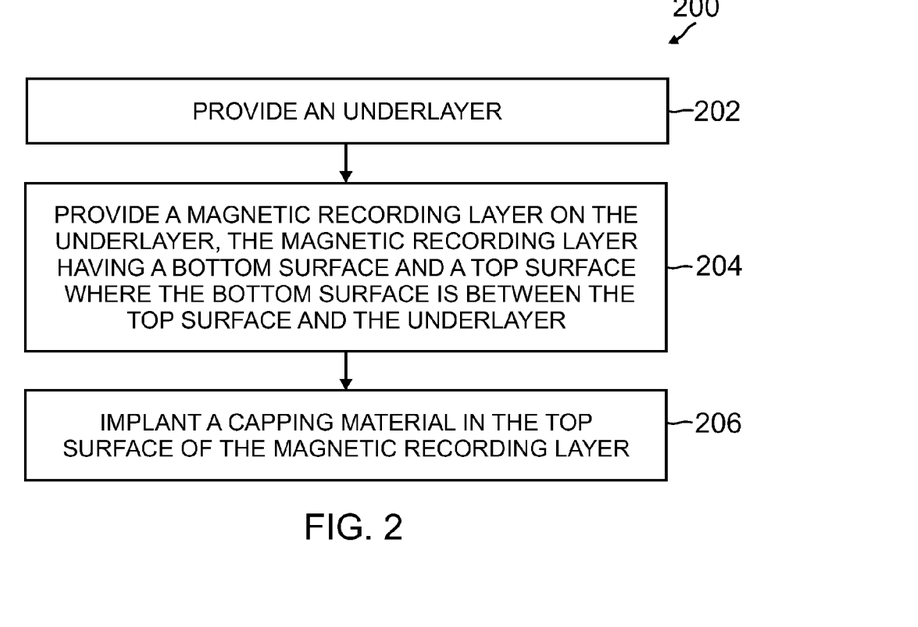
FIG. 2 is a flowchart of a process for forming a magnetic medium with a capping layer implanted in the recording layer for use in magnetic recording in accordance with one embodiment of the invention.

FIG. 2 is a flowchart of a process 200 for forming a magnetic medium with a capping layer implanted in the recording layer for use in magnetic recording in accordance with one embodiment of the invention. In particular embodiments, process 200 can be used to form or manufacture the magnetic medium 100 of FIG. 1. The process first provides (202) an underlayer. The process then provides (204) a magnetic recording layer on the underlayer, the magnetic recording layer having a bottom surface and a top surface where the bottom surface is between the top surface and the underlayer. The process then implants (206) a capping material in the top surface of the magnetic recording layer, thereby forming a capping layer at the top surface of the recording layer. In a number of embodiments, a concentration of the material for the capping layer (e.g., capping material) in an area proximate the top surface is substantially greater than a concentration of the capping material in other areas of the magnetic recording layer.

In several embodiments, the capping layer can be implanted using a direct implantation technique or an indirect implantation technique. In one embodiment, the direct implantation technique can involve implanting an ionized species of a material for the capping layer in the top surface of the recording layer. The ionized species can be a material such as Ni, Co, Fe, Cr, Ta, C, N, B, P, F, Si, Ge, and/or combinations of these or other suitable materials. In one embodiment, the indirect implantation technique can involve depositing a material for the capping layer (e.g., one or more mono-layers) on the top surface of the recording layer and then performing an ion bombardment of the capping material, thereby implanting the capping material in the recording layer. The performing an ion bombardment of the capping material can involve using an inert gas such as Ar, Kr, Xe, and/or other suitable materials to perform the ion bombardment.

In some embodiments, the process 200 includes providing additional layers such as a base substrate, an interlayer, a soft magnetic underlayer, a seed layer, a growth layer, a heat sink layer, an overcoat layer depending on the recording system (HAMR/EAMR, MAMR, PMR) that the magnetic medium is configured to be used in. Magnetic media structures including these additional layers are discussed below in the descriptions of FIGS. 4, 5, and 6.

In one embodiment, the process can perform the sequence of actions in a different order. In another embodiment, the process can skip one or more of the actions. In other embodiments, one or more of the actions are performed simultaneously. In some embodiments, additional actions can be performed.

Figure 3A:
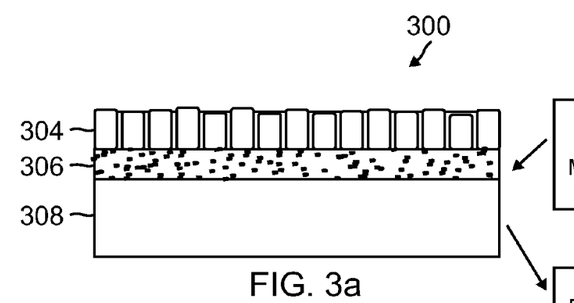
FIGS. 3a to 3d illustrate a sequence of cross sectional views of a magnetic medium for heat assisted magnetic recording in a process for indirectly implanting a capping layer in the recording layer of the magnetic medium in accordance with one embodiment of the invention.

FIGS. 3a to 3d illustrate a sequence of cross sectional views of a magnetic medium 300 for heat assisted magnetic recording in a process for indirectly implanting a capping layer 302 in the recording layer 304 of the magnetic medium 300 in accordance with one embodiment of the invention. In FIG. 3a, the process first provides (350) the magnetic medium 300 having an exposed magnetic recording layer 304 (e.g., exposed at a top surface thereof). The magnetic medium 300 further includes a seed or growth layer 306 beneath the recording layer 304 and an underlayer 308 beneath the seed layer 306. In several embodiments, the underlayer includes one or more layers. The recording layer 304 has a grain like structure arranged in a vertical orientation and can be made of FePt and/or other suitable materials.

Figure 3B:
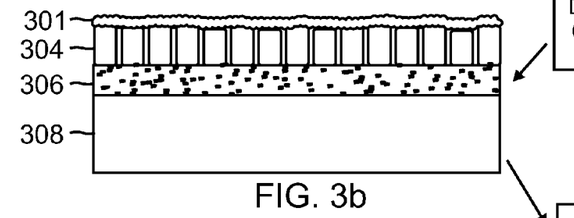

In FIG. 3b, the process deposits (352) one or more mono-layers (e.g., 1 to 5 mono-layers) of a capping material 301 on the magnetic recording layer 304. The capping material 301 can be deposited using any number of suitable deposition techniques. For example, in several embodiments, the deposition can be performed using a variety of deposition sub-processes, including, but not limited to physical vapor deposition (PVD), sputter deposition and ion beam deposition, and chemical vapor deposition (CVD) including plasma enhanced chemical vapor deposition (PECVD), low pressure chemical vapor deposition (LPCVD) and atomic layer chemical vapor deposition (ALCVD). In other embodiments, other suitable deposition techniques known in the art may also be used.

Figure 3C:
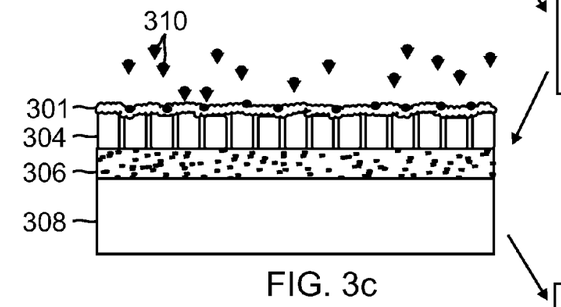
Figure 3D:
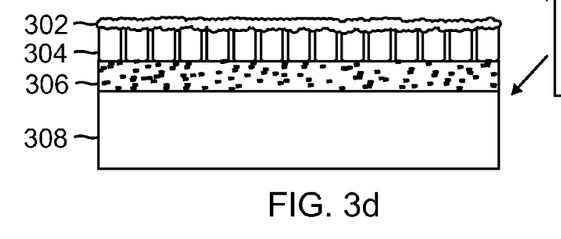

In FIG. 3c, the process performs (354) an ion bombardment (e.g., inter-mixing technique) of the capping material 301 using a preselected inert gas such as Ar, Kr, Xe, and/or other suitable materials. In operation, ions 310 of the preselected inert gas are directed at the capping material 301, make contact with the capping material 301, and drive the capping material 301 into the top surface of the recording layer 302. In one embodiment, the process performs the ion bombardment using a plasma ion immersion implantation technique. In FIG. 3d, the process has implanted (356) the capping material into the top surface of the recording layer 304 to form the implanted capping layer 302. In such case, a concentration of the capping material in the area proximate the top surface of the recording layer is substantially higher than a concentration of the capping material in other areas of the magnetic recording layer. In several embodiments, the capping material is only present in the area proximate the top surface of the recording layer and not in the other areas of the magnetic recording layer.

In some embodiments, the process performs additional actions to fix surface roughness and/or other damage caused by the capping material implantation. In one embodiment, the process can perform the sequence of actions in a different order. In another embodiment, the process can skip one or more of the actions. In other embodiments, one or more of the actions are performed simultaneously. In some embodiments, additional actions can be performed.

Figure 4:
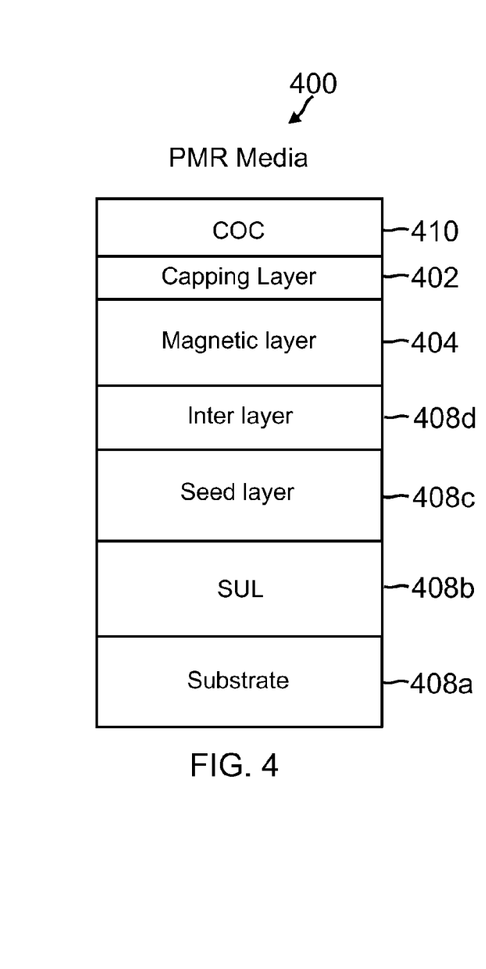
FIG. 4 is a cross sectional view of a magnetic medium for perpendicular magnetic recording (PMR) including a capping layer implanted in the recording layer in accordance with one embodiment of the invention.

FIG. 4 is a cross sectional view of a magnetic medium 400 for perpendicular magnetic recording (PMR) including a capping layer 402 implanted in the recording layer 404 in accordance with one embodiment of the invention. The PMR magnetic medium 400 has a stacked structure with a base substrate 408a, a soft magnetic underlayer (SUL) 408b on the substrate 408a, a seed layer 408c on the SUL 408b, an interlayer 408d on the seed layer 408c, the magnetic recording layer 404 on the interlayer 408d, the implanted capping layer 402 in the magnetic recording layer 404, and a carbon overcoat (COC) layer 410 on the capping layer/recording layer (402, 404). In some embodiments, the magnetic medium 400 further includes a growth layer between the interlayer 408d and the magnetic recording layer 404. In one such case, the growth layer is made of a material such as Cr, Mo, NiAl, MgO, TiC, TiN, Ag, CrMo, Pt, Pd, Ru, and/or combinations of these or other suitable materials.

In some embodiments, the substrate 408a is made of one or more materials such as an Al alloy, NiP plated Al, glass, glass ceramic, and/or combinations of these or other suitable materials. In one embodiment, the interlayer 408d is made of one or more materials such as Ag, Al, Cu, Cr, Ru, NiAl, NiTa and combinations of these and other elements. In one embodiment, the SUL 408b is made of one or more materials such as Fe, Co, Ni, B, Zr, Cr and/or combinations of these or other suitable materials. In one embodiment, the seed layer 408c is made of one or more materials such as Cr, Mo, NiAl, MgO, TiC, TiN, Ag, CrMo, Pt, Pd, Ru, and/or combinations of these or other suitable materials. In other embodiments, other suitable materials for PMR media structures can also be used.

Figure 5:
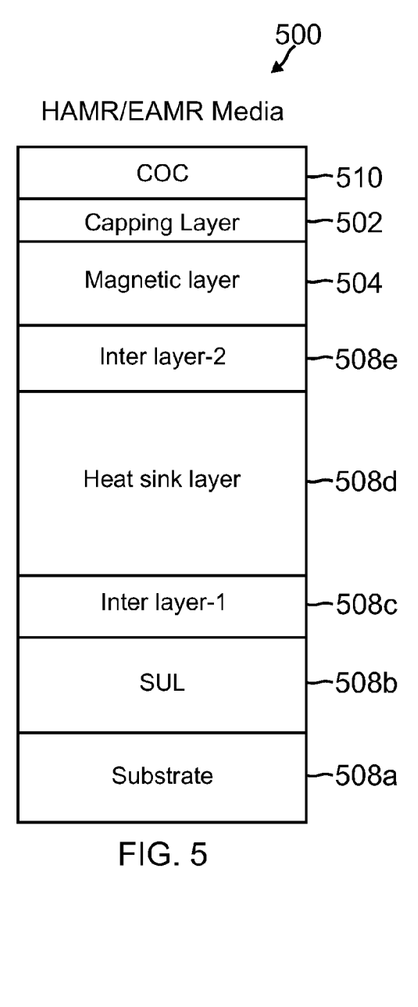
FIG. 5 is a cross sectional view of a magnetic medium for heat assisted magnetic recording (HAMR) or energy assisted magnetic recording (EAMR) including a capping layer implanted in the recording layer in accordance with one embodiment of the invention.

FIG. 5 is a cross sectional view of a magnetic medium 500 for heat assisted magnetic recording (HAMR) or energy assisted magnetic recording (EAMR) including a capping layer 502 implanted in the recording layer 504 in accordance with one embodiment of the invention. The HAMR/EAMR magnetic medium 500 has a stacked structure with a base substrate 508a, a soft magnetic underlayer (SUL) 508b on the substrate 508a, a first interlayer 508c on the SUL 508b, a heat sink layer 508d on the first interlayer 508c, a second interlayer 508e on the heat sink layer 508d, the magnetic recording layer 504 on the second interlayer 508e, the implanted capping layer 502 in the magnetic recording layer 504, and a carbon overcoat (COC) layer 510 on the capping layer/recording layer (502, 504).

In some embodiments, the magnetic medium 500 further includes a growth layer between the second interlayer 508e and the magnetic recording layer 504. In one such case, the growth layer is made of a material such as Cr, Mo, NiAl, MgO, TiC, TiN, Ag, CrMo, Pt, Pd, Ru, and/or combinations of these or other suitable materials. In several embodiments, the substrate, SUL, first interlayer and second interlayer can be made of the materials described above for the PMR medium of FIG. 4. In one embodiment, the heat sink layer 508d is made of one or more materials such as Ag, Al, Cu, Cr, Ru, NiAl, NiTa, and combinations of these or other suitable materials. In other embodiments, other suitable materials for HAMR/EAMR media structures can also be used.

Figure 6:
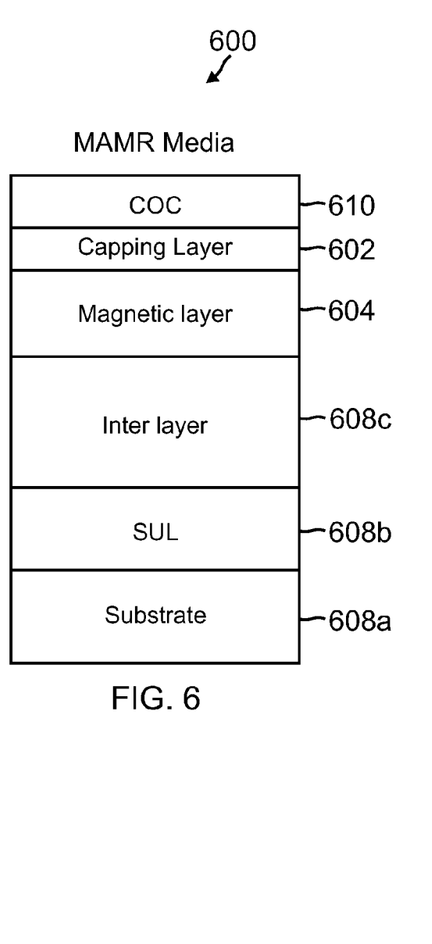
FIG. 6 is a cross sectional view of a magnetic medium for microwave assisted magnetic recording (MAMR) including a capping layer implanted in the recording layer in accordance with one embodiment of the invention.

FIG. 6 is a cross sectional view of a magnetic medium 600 for microwave assisted magnetic recording (MAMR) including a capping layer 602 implanted in the recording layer 604 in accordance with one embodiment of the invention. The MAMR magnetic medium 600 has a stacked structure with a base substrate 608a, a soft magnetic underlayer (SUL) 608b on the substrate 608a, an interlayer 608c on the SUL 608b, the magnetic recording layer 604 on the interlayer 608c, the implanted capping layer 602 in the magnetic recording layer 604, and a carbon overcoat (COC) layer 610 on the capping layer/recording layer (602, 604).

In some embodiments, the magnetic medium 600 further includes a growth layer between the interlayer 608c and the magnetic recording layer 604. In one such case, the growth layer is made of a material such as Cr, Mo, NiAl, MgO, TiC, TiN, Ag, CrMo, Pt, Pd, Ru, and/or combinations of these or other suitable materials. In several embodiments, the substrate, SUL, and interlayer can be made of the materials described above for the PMR medium of FIG. 4. In other embodiments, other suitable materials for MAMR media structures can also be used.

Figure 7:
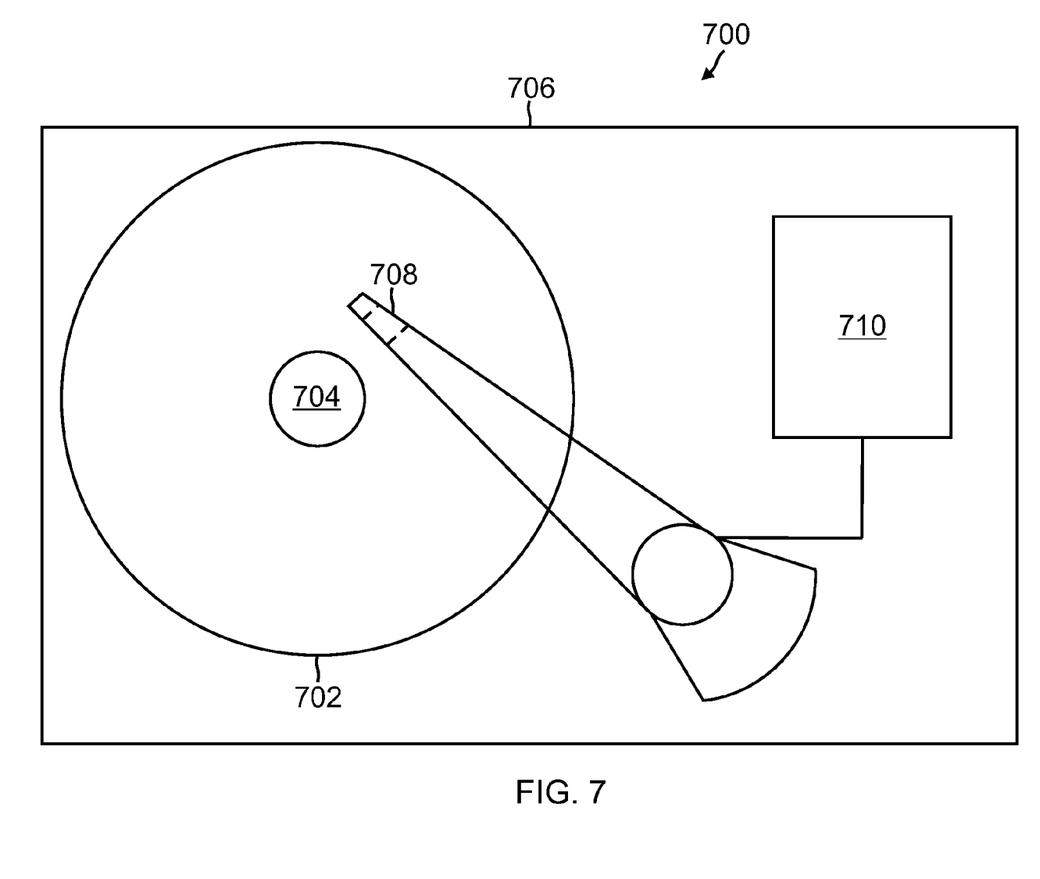
FIG. 7 is a top schematic view of a disk drive having a magnetic medium or disk with a capping layer implanted in the recording layer in accordance with one embodiment of the invention.

FIG. 7 is a top schematic view of a disk drive 700 having a magnetic medium or disk 702 with a capping layer implanted in the recording layer in accordance with one embodiment of the invention. Disk drive 700 may include one or more disks 702 to store data. Disk 702 resides on a spindle assembly 704 that is mounted to drive housing 706. Data may be stored along tracks in the magnetic recording layer of disk 702. The reading and writing of data is accomplished with head 708 that has both read and write elements. The write element is used to alter the properties of the magnetic recording layer of disk 702. In one embodiment, head 708 may have magneto-resistive (MR), or giant magneto-resistive (GMR) elements. In an alternative embodiment, head 708 may be another type of head, for example, an inductive read/write head or a Hall effect head.

In some embodiments, the disk 702 has any of the media structures depicted in FIG. 1, 3d, 4, 5, or 6. In operation, a spindle motor (not shown) rotates spindle assembly 704, and thereby rotates disk 702 to position head 708 at a particular location along a desired disk track. The position of head 708 relative to disk 702 may be controlled by position control circuitry 710. The use of disk 702 fabricated in the manners discussed above may improve the performance of the magnetic recording layer of the disk in a disk drive configured for HAMR/EAMR, PMR, or MAMR.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

In one embodiment, the methods for forming implanted capping layers in magnetic media for magnetic recording can be applied to a patterned media such as discrete track media. In such case, the methods can be configured to render the implanted region substantially non-magnetic while leaving the islands/tracks as being substantially magnetic on the surface of the media.

In some embodiments, depending on the choice of element, ion dose, or other process conditions, the implanted region can be crystalline, amorphous, nano-crystalline or may present a large number of crystalline defects (vacancies, dislocations, etc). This may actually widen the window for tailoring properties and need not be a negative aspect.

What is claimed is:

1. A magnetic medium having an implanted capping layer, the medium comprising:
    an underlayer; and
    a magnetic recording layer on the underlayer, the magnetic recording layer comprising a bottom surface and a top surface wherein the bottom surface is between the top surface and the underlayer;
    wherein the top surface of the magnetic recording layer comprises a capping material implanted in the top surface using ion implantation, and
    wherein the capping material comprises a material selected from the group consisting of Ni, Fe, and combinations thereof.

2. The magnetic medium of claim 1, wherein the capping material is implanted in the top surface using an inter-mixing technique.

3. The magnetic medium of claim 2, wherein the inter-mixing technique comprises performing an ion bombardment using an inert gas ion selected from the group consisting of Ar, Kr, Xe, and combinations thereof.

4. The magnetic medium of claim 1, wherein the capping material is directly implanted in the top surface with an ionized species of the capping material.

5. The magnetic medium of claim 4, wherein the ionized species of the capping material comprises a material selected from the group consisting of Ni, Co, Fe, Cr, Ta, C, N, B, P, F, Si, Ge, and combinations thereof.

6. The magnetic medium of claim 1, wherein the magnetic recording layer is configured for use in a magnetic recording system selected from the group consisting of a heat assisted magnetic recording system, an energy assisted magnetic recording system, and a perpendicular magnetic recording system.

7. The magnetic medium of claim 1, wherein the magnetic recording layer comprises FePt.

8. The magnetic medium of claim 1, further comprising:
    an overcoat layer on the magnetic recording layer;
    wherein the underlayer comprises:
        a substrate; and
        an interlayer on the substrate; and
    wherein the magnetic recording layer is on the interlayer.

9. The magnetic medium of claim 8, further comprising a soft magnetic underlayer between the substrate and the interlayer.

10. The magnetic medium of claim 9, further comprising a seed layer between the soft magnetic underlayer and the interlayer.

11. The magnetic medium of claim 8, further comprising:
    a growth layer between the interlayer and the magnetic recording layer;
    wherein the interlayer comprises a heat sink layer;
    wherein the substrate comprises a material selected from the group consisting of an Al alloy, NiP plated Al, glass, glass ceramic, and combinations thereof;
    wherein the heat sink comprises a material selected from the group consisting of Ag, Al, Cu, Cr, Ru, NiAl, NiTa, and combinations thereof;
    wherein the growth layer comprises a material selected from the group consisting of Cr, Mo, NiAl, MgO, TiC, TiN, Ag, Pt, Pd, Ru, and combinations thereof; and
    wherein the overcoat layer comprises C.

12. The magnetic medium of claim 1, wherein a concentration of the capping material in an area proximate the top surface is greater than a concentration of the capping material in other areas of the magnetic recording layer.

13. The magnetic medium of claim 1, wherein the capping material implanted in the top surface using ion implantation is configured to reduce a roughness of the top surface of the magnetic recording layer.

14. The magnetic medium of claim 1, wherein the capping material forms the implanted capping layer along the top surface of the magnetic recording layer.

15. A magnetic medium having an implanted capping layer, the medium comprising:
    an underlayer; and
    a magnetic recording layer on the underlayer, the magnetic recording layer comprising a bottom surface and a top surface wherein the bottom surface is between the top surface and the underlayer;
    wherein the top surface of the magnetic recording layer comprises at least a monolayer of a capping material implanted in the top surface using ion implantation, and
    wherein the implanted capping material is coextensive with the top surface of the magnetic recording layer.

16. The magnetic medium of claim 15, wherein the capping material is implanted in the top surface using an inter-mixing technique.

17. The magnetic medium of claim 15, wherein the capping material comprises a material selected from the group consisting of Ni, Co, Fe, Pd, Pt, Cr, V, Mo, W, B, C, Ta, Ag, P, Si, Ge, F, and combinations thereof.

18. A magnetic medium having an implanted capping layer, the medium comprising:
    an underlayer; and
    a magnetic recording layer on the underlayer, the magnetic recording layer comprising a bottom surface and a top surface wherein the bottom surface is between the top surface and the underlayer;
    wherein the top surface of the magnetic recording layer comprises a capping material implanted in the top surface using ion implantation, and wherein the implanted capping material is coextensive with and is substantially uniform across the top surface of the magnetic recording layer.

19. The magnetic medium of claim 18, wherein the capping material is implanted in the top surface using an inter-mixing technique.

20. The magnetic medium of claim 18, wherein the capping material comprises a material selected from the group consisting of Ni, Co, Fe, Pd, Pt, Cr, V, Mo, W, B, C, Ta, Ag, P, Si, Ge, F, and combinations thereof.

* * * * *